United States Patent
Balarajashetty et al.

(10) Patent No.: US 12,207,096 B2
(45) Date of Patent: *Jan. 21, 2025

(54) SYSTEMS AND METHODS FOR MANAGING REMOTE CONTROL UNITS AND PAIRED DEVICES

(71) Applicant: DISH Network Technologies India Private Limited, Bengaluru (IN)

(72) Inventors: Vikram Balarajashetty, Marathahalli (IN); Laxminarayana Dalimba, Marathahalli (IN); Arun Pulasseri Kalam, Varthur (IN)

(73) Assignee: DISH Network Technologies India Private Limited (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/443,132

(22) Filed: Feb. 15, 2024

(65) Prior Publication Data

US 2024/0244438 A1     Jul. 18, 2024

Related U.S. Application Data

(63) Continuation of application No. 17/188,666, filed on Mar. 1, 2021, now Pat. No. 11,943,622.

(30) Foreign Application Priority Data

Mar. 6, 2020 (IN) .............................. 202041009662

(51) Int. Cl.
  *H04W 12/50*  (2021.01)
  *G08C 17/02*  (2006.01)
  *G08C 23/04*  (2006.01)

(52) U.S. Cl.
  CPC ............ *H04W 12/50* (2021.01); *G08C 17/02* (2013.01); *G08C 23/04* (2013.01); *G08C 2201/20* (2013.01)

(58) Field of Classification Search
  CPC .... G08C 17/02; G08C 23/04; G08C 2201/20; H04N 21/42221; H04N 21/43615; H04W 12/50
  See application file for complete search history.

(56) References Cited

U.S. PATENT DOCUMENTS 7,600,248 B1   10/2009   Berry
7,626,641 B1   12/2009   Beals
(Continued)

OTHER PUBLICATIONS

Agarwal, Shubham, "What is a Chromecast and How Does it Work?", Make Use of https://www.makeuseof.com/tag/what-is-chromecast-how-does-chromecast-work/, Jul. 7, 2022, 12 pages.

(Continued)

*Primary Examiner* — Adnan Aziz
(74) *Attorney, Agent, or Firm* — Jeremiah J. Baunach; Frontier IP Law PLLC

(57) ABSTRACT

A unique code per pairing of each remote control to each controlled device (such as a TV or other media device) is used in infrared (IR) commands sent by the remote control for the device to detect if the remote control has been moved to a different room. The remote control supports both IR and short range wireless radio (e.g., Bluetooth®) commands. Both IR and Bluetooth® commands are sent on every key press of the remote control unit. When the IR command is received by the device, the device will check if the unique code is from a remote control unit currently paired to the device. If the unique code is not from a remote control unit currently paired to the device, the device will initiate pairing with the remote control unit and execute the command.

6 Claims, 7 Drawing Sheets

(56) References Cited

U.S. PATENT DOCUMENTS

| | | | |
|---|---|---|---|
| 7,805,751 B1 | 9/2010 | Dugan et al. | |
| 7,814,510 B1 | 10/2010 | Ergen et al. | |
| 8,098,337 B2 | 1/2012 | Martch | |
| 8,344,859 B2 | 1/2013 | Reams et al. | |
| 8,418,211 B2 | 4/2013 | Beals | |
| 8,461,960 B2 | 6/2013 | Nakano et al. | |
| 8,544,054 B2 | 9/2013 | Reams et al. | |
| 8,887,209 B2 | 11/2014 | Rudolph et al. | |
| 8,941,784 B2 | 1/2015 | Hale et al. | |
| 8,983,387 B1 | 3/2015 | Maclean | |
| 9,083,914 B2 | 7/2015 | Kummer | |
| 9,210,357 B1 | 12/2015 | Dong et al. | |
| 9,713,234 B2 | 7/2017 | Gotoh et al. | |
| 10,142,668 B1 | 11/2018 | Nijim et al. | |
| 10,404,801 B2 * | 9/2019 | Martch | H04W 4/80 |
| 11,259,348 B2 | 2/2022 | Ganesan et al. | |
| 2003/0140345 A1 | 7/2003 | Fisk et al. | |
| 2006/0149840 A1 | 7/2006 | Thompson et al. | |
| 2007/0080823 A1 | 4/2007 | Fu et al. | |
| 2007/0081537 A1 | 4/2007 | Wheelock | |
| 2007/0153820 A1 | 7/2007 | Gould | |
| 2010/0052870 A1 | 3/2010 | King | |
| 2010/0165216 A1 | 7/2010 | Beals | |
| 2010/0328132 A1 | 12/2010 | Reams et al. | |
| 2012/0242455 A1 | 9/2012 | Hale et al. | |
| 2012/0263089 A1 | 10/2012 | Gupta et al. | |
| 2012/0284736 A1 | 11/2012 | Friedman | |
| 2013/0013698 A1 | 1/2013 | Relyea et al. | |
| 2013/0057778 A1 | 3/2013 | Hale et al. | |
| 2013/0093962 A1 | 4/2013 | Bruhn et al. | |
| 2014/0087714 A1 | 3/2014 | Luo et al. | |
| 2014/0203920 A1 | 7/2014 | Baker et al. | |
| 2014/0267934 A1 * | 9/2014 | Hardin | H04N 21/42221 348/734 |
| 2016/0125733 A1 * | 5/2016 | Sallas | G08C 17/02 398/106 |
| 2016/0164935 A1 | 6/2016 | Chen et al. | |
| 2016/0255391 A1 | 9/2016 | Noble | |
| 2016/0345054 A1 | 11/2016 | Dhaipule | |
| 2017/0019720 A1 | 1/2017 | Chawla et al. | |
| 2018/0063716 A1 | 3/2018 | Weigand et al. | |
| 2019/0116334 A1 * | 4/2019 | Lim | H04N 21/4108 |
| 2020/0037025 A1 | 1/2020 | Zerr et al. | |
| 2022/0030319 A1 | 1/2022 | Lee et al. | |

OTHER PUBLICATIONS

Chromecast built-in / TVs with Chromecast built-in, https://www.google.com/chromecast/built-in/tv/#/compare, 5 pages.

* cited by examiner

SYSTEMS AND METHODS FOR MANAGING REMOTE CONTROL UNITS AND PAIRED DEVICES

TECHNICAL FIELD

The present disclosure generally relates to remote control units, and more particularly to managing remote control units and corresponding devices which are controlled by such remote control units.

BRIEF SUMMARY

In buildings with multiple rooms, such as hotels, offices and houses, remote control units (also referred to as "remote control devices", "remote controls" or "remotes") of televisions/set-top boxes or any other device (i.e., "device") getting swapped between rooms is a common scenario. If the remote control is Bluetooth® (BT) based, then such swapping leads to problems. For example, if the remote control is moved to a different room than that of the device to which the remote control was originally paired, the remote control could still possibly control the device to which the remote control was originally paired, even though it is now in a different room. This can be very confusing for the end user.

The above technical problem may be solved by the following technical solution. Typically, when remote control units are swapped, there is no automatic mechanism to detect that the remotes are swapped. Because of this, the user in one room may continue to control the device to which the remote control was originally paired in the other room on every remote button press. This problem may be solved by having a unique code per pairing of remote to device, and using this unique code in every infrared (IR) command to detect if the remote control has been swapped. In one embodiment, the remote control supports both IR and short range wireless radio (e.g., "Bluetooth®) commands. In one embodiment, both IR and Bluetooth® commands are sent on every key press of the remote control unit. When the IR command is received by the device, the device will check if the unique code is from a remote control unit currently paired to the device. For example, this may be performed by extracting the unique code from the command and comparing it to a previously stored unique code associated with a remote control unit previously paired to the device. If the unique code extracted from the command matches the previously stored unique code associated with a remote control unit previously paired to the device, then the device will immediately execute the command. If the unique code extracted from the command does not match the previously stored unique code associated with a remote control unit previously paired to the device, a pairing process may be initiated to pair the new remote, and then the command may be executed (or in some instances the command may first be executed and the pairing process will then be initiated). This handles the scenario of swapping the remote control. This also helps in automatically handling the scenario when Bluetooth® connectivity has issues because of low-battery or a faulty Bluetooth module.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

Figure 1:
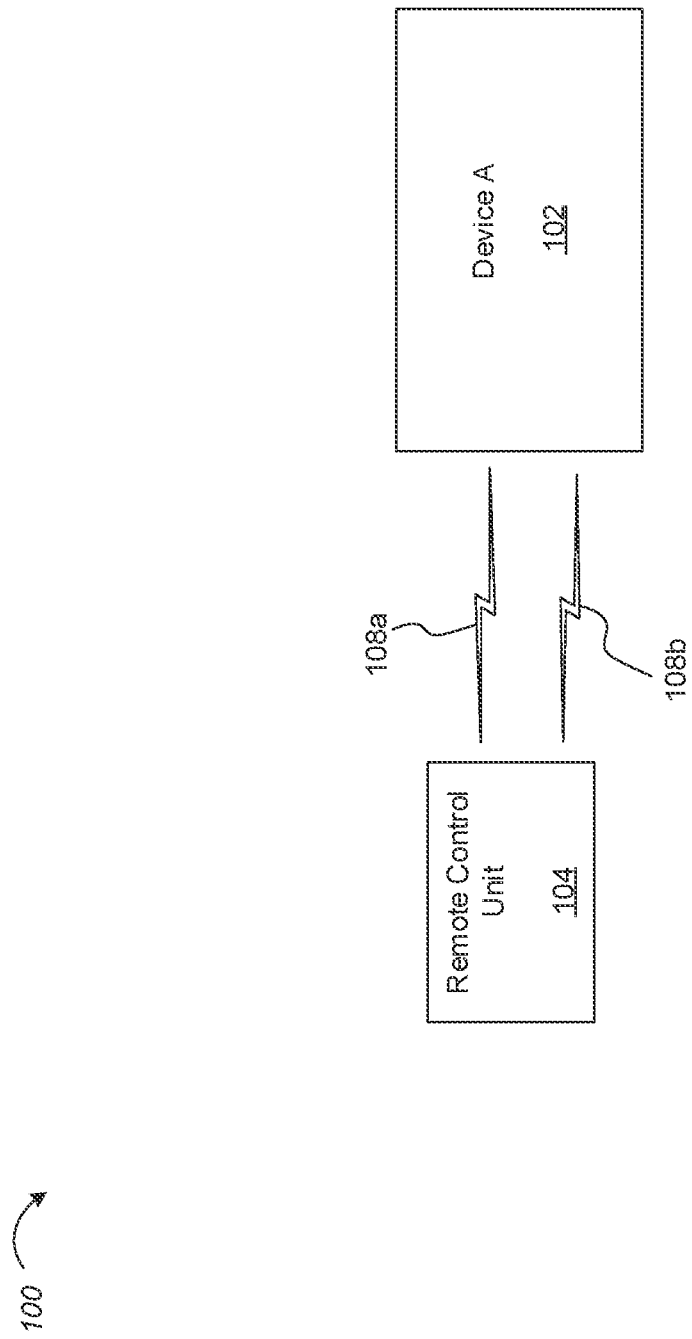
FIG. 1 is a schematic view of a system for managing remote control units and paired devices, according to various embodiments as disclosed herein.

FIG. 1 is a schematic view of a system 100 for managing remote control units and paired devices, according to various embodiments as disclosed herein. Specifically, remote control unit 104 is paired to device A 102, according to one non-limiting illustrated embodiment.

The device A 102 may be any electronic device that has a functionality that may be made available to a user. For example, the device A 102 may be one or any combination of: a media device (e.g., any electronic device that receives and/or stores and plays video and/or audio); a receiving device (e.g., cable and/or satellite set-top box or a radio); a television, a digital versatile disk (DVD) player and/or recorder; a digital video recorder (DVR); a music player; a desktop computer; a mainframe computer; a server; a notebook computer; a tablet device; a video game console; an electronic game; a gaming device; an electronic educational device; an electronic children's toy; an electronic book reader; an entertainment system and/or device; an electronic locking device; a remote control device; a network appliance; a home appliance; an office appliance; a home security system device; a watch; a vehicle head unit, deck, stereo, navigation system and/or other electronic media system of a vehicle; a mobile communications and/or processing device having a handheld form factor (e.g., cellular phones, personal digital assistants or (PDAs), Blackberry® devices, iPhone® devices, Android® devices, smartphones, cellular enabled laptop computers, netbook computers and/or tablet devices); or the like.

In various embodiments, the device A 102 is able to communicate with remote control unit 104 directly over wireless connection 108a and wireless connection 108b. For example, in some embodiments, the type of wireless communication connection 108a may be a non-line-of-sight connection (a connection that does not require a line of sight between the remote control unit 104 and the device A 102 to communicate with the device A 102), such as a short-range radio wireless connection including, but not limited to, one or more of: a wireless point-to-point connection; a radio frequency identification (RFID) connection; a near field communication (NFC) connection; a Bluetooth® connection; a wireless universal serial bus (USB) connection, a Z-Wave connection according to the ITU-T G.9959 specification or applicable variations thereof, a ZigBee connection according to the IEEE 802.15 specification or applicable variations thereof, a wireless home area network (HAN) connection (e.g., such as that based on the IEEE 802.11 specification or other applicable wireless standards); a wireless body area network connection (WBAN); a wireless personal area network (WPAN) connection, such as that based on the standard IEEE 802.15 specification or variations thereof; a Wi-Fi connection such as that based on IEEE 802.11 specification or variations thereof; and/or variations of such connections and applicable wireless protocol standards thereof.

In some embodiments, the type of wireless communication connection 108b may be a wireless line-of-sight connection, for example, an infrared connection, such as an Infrared Data Association (IrDA) connection according to the applicable IrDA specifications or applicable variations thereof. In such embodiments, the remote control unit 104 may send commands as infrared signals to device A 102 via the connection 108b without being paired to device A 102. In the present example embodiments, remote control unit 104 may send commands via both the non-line-of-sight connection 108a and the line-of-sight connection 108b. The device A 102 will then receive the commands via a corresponding communications module(s) that include a corresponding receiver and/or transceiver and networking interface(s) configured to receive and process commands via the non-line-of-sight connection (e.g., Bluetooth®) and line-of-sight connection (e.g., infrared).

Figure 2:
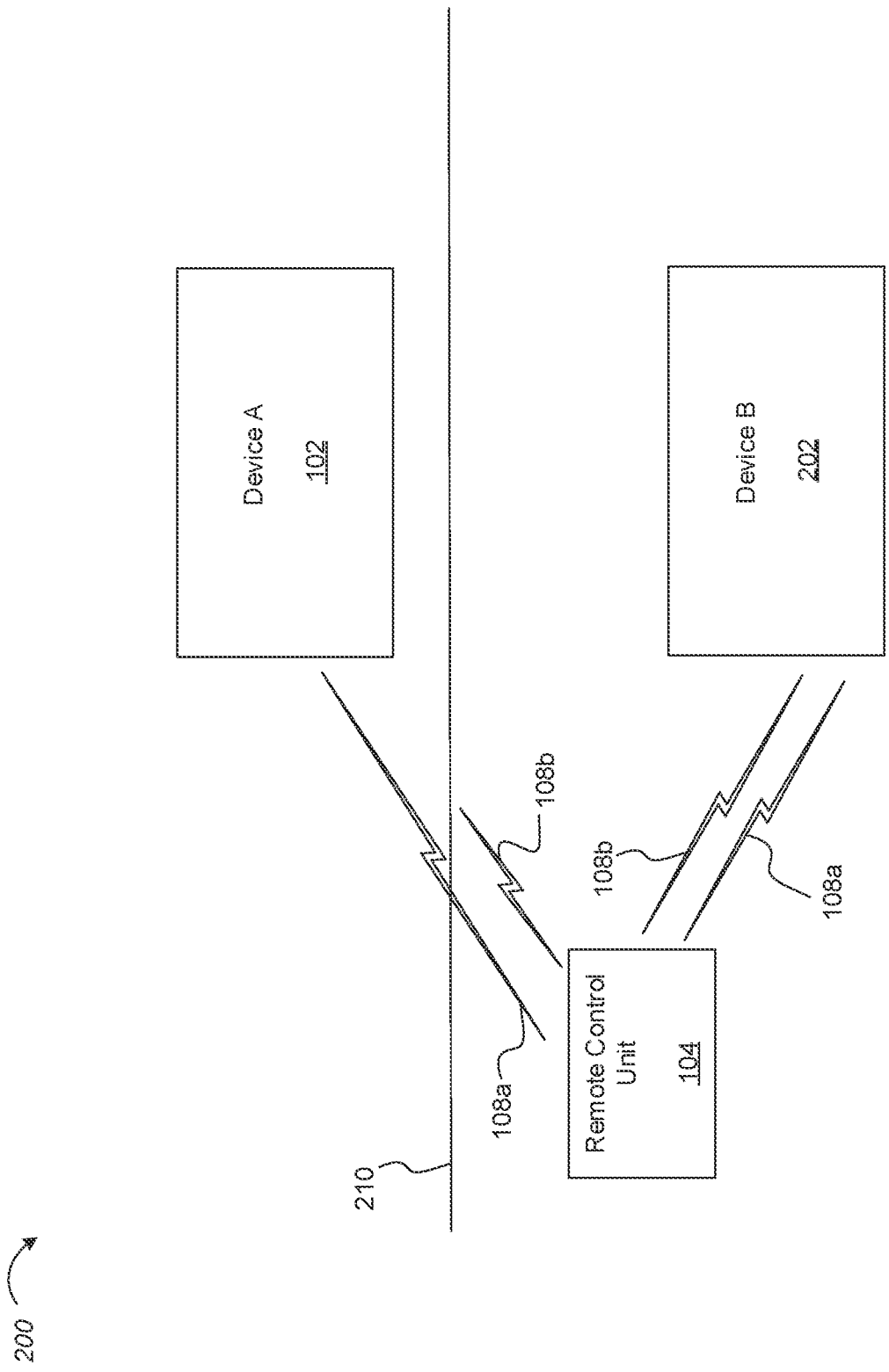
FIG. 2 is a schematic view of a system for managing remote control units and paired devices in a scenario where the remote control unit is moved to a different room, according to various embodiments as disclosed herein.

FIG. 2 is a schematic view of a system 200 for managing remote control units and paired devices in a scenario where the remote control unit 104 is moved to a different room, according to various embodiments as disclosed herein.

As shown in FIG. 2, the remote control unit 104 has now been moved to a different room that has a different device B 202. For example, the device A 102 may be separated by a wall or other barrier 210 from device B 202, such that the barrier 210 now blocks or prevents the line-of-sight signals (e.g., infrared signals) sent via the line-of-sight connection 108b from the remote control unit 104 from being received by device A 102. However, the remote control unit 104 may still be able to communicate through the barrier 210 with device A 102 via non-line-of-sight connection 108a (e.g., Bluetooth® connection), and thus, device A 102 may still be able to receive such commands sent via the non-line-of-sight connection 108a and be controlled by remote control unit 104. This may cause problems and be very confusing for the end user.

However, since being paired with device A 102, for each command sent from the remote control unit 104 via the line-of-sight connection 108b, the remote control unit 104 also sends a code unique to and associated with the current pairing of the remote control unit 104 to device A 102. This code is sent via the line-of-sight connection 108b, which is different than the wireless medium (non-line-of-sight connection 108a) over which the pairing occurred, but such commands sent via the line-of-sight connection 108b are no longer being received by device A 102 due to device A 102 being in the other room behind the wall or other barrier 210.

Device B 202 then receives such commands sent from the remote control unit 104 via the line-of-sight connection 108b along with the code unique to and associated with the current pairing of the remote control unit 104 to device A 102. Device B 202 may extract the code from the command (or otherwise receive the code) and compare the code to one or more previously stored codes associated with one or more respective remote control units currently paired to device B 202 (if any). If device B 202 determines the extracted code does not match any previously stored code associated with a remote control unit currently paired to the device, then device B may determine that the command is not from a remote control unit currently paired with device B 202 based on that determination. If device B 202 determines the extracted code does match a previously stored code associated with a remote control unit currently paired to the device, then device B may determine that the command is from a remote control unit currently paired with device B 202 based on that determination and then immediately execute the command.

If device B 202 determines that the command is not from a remote control unit currently paired with device B 202, then device B 202 may initiate pairing of the remote control unit 104 to device B 202 in response to that determination. In some embodiments, the pairing process with device B 202 includes first causing the remote control unit 104 to unpair from device A 102. Then the command may be executed by device B 202 after the pairing (or in some instances the command may first be executed by device B 202 and the pairing process will then be initiated). In some embodiments, the command will be executed only if received via the line-of-sight connection 108b and after pairing via the non-line-of-sight connection 108a. In some embodiments, sending the command both via the line-of-sight connection 108b and the non-line-of-sight connection 108a automatically handles the scenario when connectivity of the non-line-of-sight connection 108a has issues because of low-battery or a faulty module (e.g., faulty Bluetooth® module), as the device B 202 may still execute the command received via the line-of-sight connection 108b (e.g., infrared signal) even though the command may not have been received via the non-line-of-sight connection 108a.

Device B 202 may then (or as part of the pairing process) communicate a code to the remote control unit 104 that is unique to and is associated with the pairing of the remote control unit 104 to device B 202. The remote control unit 104 will then send the code along with, embedded with, or otherwise associated with each remote control command sent going forward via a wireless medium different than the wireless medium over which the pairing occurred (e.g., via line-of-sight connection 108b). Device B 202 may then store the code communicated to the remote control unit 104 for future comparison with codes of additional commands sent to device B 202 via a line-of-sight connection to determine whether the additional commands are from one or more remote control units currently paired with device B 202. In some embodiments, the remote control unit 104 and/or the corresponding device may generate the code such that it is unique to and is associated with the pairing of the specific remote control unit to the specific device. For example, both the remote control unit 104 and/or the corresponding device may verify that a code is unique to and is associated with the pairing of the specific remote control unit to the specific device.

This same process may be implemented on multiple different devices and corresponding remote control units in various different rooms, such that when a remote control unit is moved to a new room it will seamlessly pair with the device in that new room to operate that device and cease controlling the device in the previous room until the remote control unit is moved back to the previous room.

In various embodiments, the system 200 for managing remote control units and paired devices may include additional elements than that shown in FIG. 2, such as in embodiments including multiple remote control units and additional devices in additional different rooms in a building.

Figure 3:
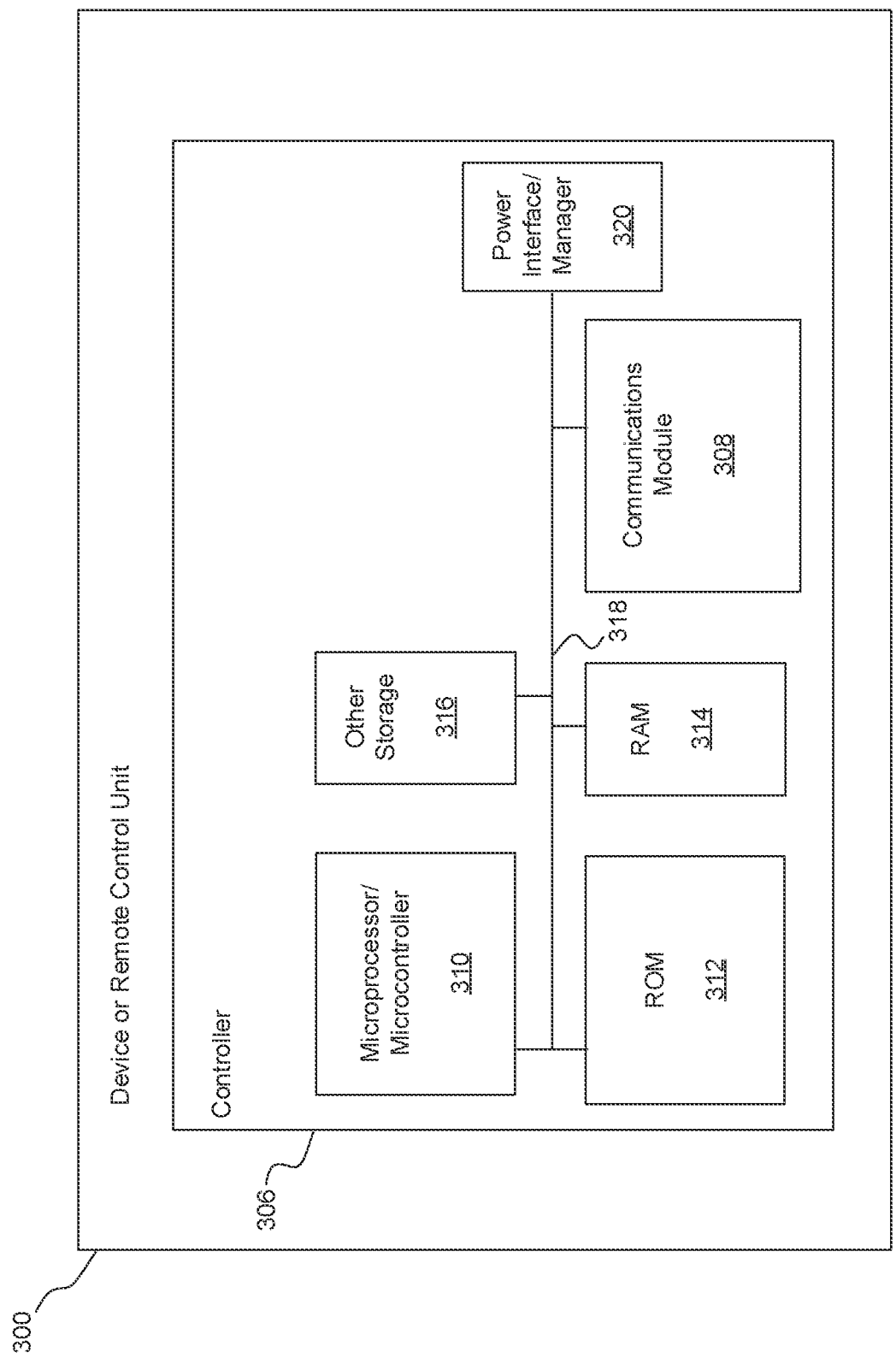
FIG. 3 is a schematic view of a controller in a system for managing remote control units and paired devices, according to various embodiments as disclosed herein.

FIG. 3 is a schematic view of a controller 306 in a system for managing remote control units and paired devices, according to various embodiments as disclosed herein.

In various embodiments, the controller 306 is an example of a controller that may be of a device 300, such as device A 102 or device B 202 and/or a remote control unit, such as remote control unit 104. Thus, in various example embodiments, device 300 may be an example of and/or represent device A 102, device B 202 and/or remote control unit 104.

The controller 306 includes a microprocessor 310, a communications module 308, and a power interface manager 320 connected via one or more buses 318 (only one illustrated). The controller 306 performs or causes various operations described herein of the system 200 to be performed. For example, the controller 306 is configured to use the communications module 308 to wirelessly receive information directly from the external remote control unit 104 directly over the corresponding wireless connections 108a and 108b (shown in FIG. 1 and FIG. 2) and make a determination whether a command received via connection 108b is from a remote control unit currently paired with the device, and then determine whether to initiate pairing of the remote control unit to the device in response to the determination of whether the command is from a remote control unit currently paired with the device.

In some embodiments, the microprocessor 310 of the controller 306 may also be that which controls other functions of device A 102 and/or device B 202. Additionally, in some embodiments, an equivalent controller 306, or applicable modules thereof, may also be present in remote control unit 104 to cause the functions described herein of the remote control unit 104 to be performed.

The microprocessor 310, for example, is a microprocessor, microcontroller, programmable logic controller (PLC), CPU programmable gate array (PGA), application specific integrated circuit (ASIC) or another controller capable of receiving signals from various sensors, performing logical operations, and sending signals to various components. Typically, the microprocessor 310 may take the form of a CPU microprocessor of the type used in a computer, such as those made by INTEL, AMD, and the like. The controller 306 may also include one or more non-transitory processor- or computer-readable storage media, for example, read only memory (ROM) 312, random access memory (RAM) 314, and other storage 316 (e.g., solid-state storage media such as flash memory or EEPROM, spinning storage media such as hard disk). The non-transitory computer-readable storage media 312, 314, 316 may be in addition to any non-transitory storage medium (e.g., registers) which is part of the microprocessor 310. The controller 306 may include one or more buses 318 (only one illustrated) coupling various components together, for example, one or more power buses, instruction buses, data buses, etc.

As illustrated, the ROM 312, or some other one of the non-transitory processor- or computer-readable storage media 312, 314, 316, stores instructions and/or data or values for variables or parameters. The sets of data may take a variety of forms, for example, a lookup table, a set of records in a database, etc. The instructions and sets of data or values are executable by the microprocessor 310. Execution of the instructions and sets of data or values causes the microprocessor 310 to perform specific acts to cause the controller 306 to generate control signals to, as applicable: use the communications module 308 to wirelessly receive information directly from the external remote control unit 104 and/or other remote control unit 106 directly over the corresponding wireless connections 108a and 108b (shown in FIG. 1 and FIG. 2); determine whether the command is from a remote control unit currently paired with the device; determine whether to initiate pairing of the remote control unit to the device in response to the determination of whether the command is from a remote control unit currently paired with the device; execute the command; and other functionalities of the system 200 as described herein. Performance of specific operations caused by the controller 306 is described herein and also below with reference to various flow diagrams (shown in FIGS. 5-7).

The microprocessor 310 may use RAM 314 for volatile storage of instructions, data, etc. The microprocessor 310 may use other storage 316 to log or retain information, for example, information including, but not limited to: wirelessly received information from the remote control unit 104 and/or other remote control units 106 directly over the corresponding wireless connections 108a and 108b, codes unique to and associated with corresponding pairings of the remote control unit to specific remote control units; user credentials such as user name and passwords, other codes, a security key, an identification number, a time-based code, a combination, biometric data, an encryption key, an encrypted key, computer executable instructions; etc. The instructions are executable by the microprocessor 310 to control operation of the controller 306 in response to input from remote systems such as those of the remote control unit 104. The controller 306 may also receive signals from various sensors, transmitters, transceivers, and/or components of the remote control unit 104 via the communications module 308. This information may include information that characterizes or is indicative of the authenticity, authorization level, operation, status, and/or condition of such components, the remote control unit 104 and/or other remote control units.

The communications module 308 may include one or more communications modules or components which facilitates communications with the various components of the remote control unit 104 and other remote control units, such that data may be exchanged between the remote control unit 104 and the device 300 for authentication purposes. The communications module 308 may additionally provide wired communications, such as to communicate over those which may occur between the device 300 and other devices, such as receiving devices, network equipment and other media devices. The communications module 308 may include one or more ports, wireless receivers, wireless transmitters or wireless transceivers to provide wireless signal paths to the remote control unit 104 and/or various other remote components or systems.

The communications module 308 may, for example, include components enabling communication over a short-range wireless connection including, but not limited to, one or more of: a wireless point-to-point connection; a radio frequency identification (RFID) connection; a near field communication (NFC) connection; a Bluetooth® connection; an Infrared Data Association (IrDA) connection according to the applicable IrDA specifications or applicable variations thereof; a wireless universal serial bus (USB) connection; a Z-Wave connection according to the ITU-T G.9959 specification or applicable variations thereof; a ZigBee connection according to the IEEE 802.15 specification or applicable variations thereof; a wireless home area network (HAN) connection (e.g., such as that based on the IEEE 802.11 specification or other applicable wireless standards); a wireless body area network connection (WBAN); a wireless personal area network (WPAN) connection, such as that based on the standard IEEE 802.15 specification or variations thereof; a Wi-Fi connection such as that based on IEEE 802.11 specification or variations thereof; and/or variations of such connections and applicable wireless protocol standards thereof. The communications module 308 may include one or more modems or one or more Ethernet or other types of communication cards or components for enabling network communications as applicable. The communications module 308 may include one or more modules suitable to handle network traffic including switched packet type communications protocols (TCP/IP), Ethernet or other networking protocols. In some embodiments, some or all of the components of the controller 306 may be located outside of the device 300 as a separate device that authenticates, verifies or otherwise controls other security functions of the device 300. Also, the communications module 308 may be configured to provide encrypted communications over the connections 108a, 108b. In some embodiments, a separate communications module (not shown) of the device 300 is configured for and responsible for communications over the other networks (e.g., the Internet).

The Power Interface Manager 320 is controllable by the microprocessor 310 and is configured to provide power to the controller 306 from either a built-in battery (not shown) or an external power source.

Figure 4:
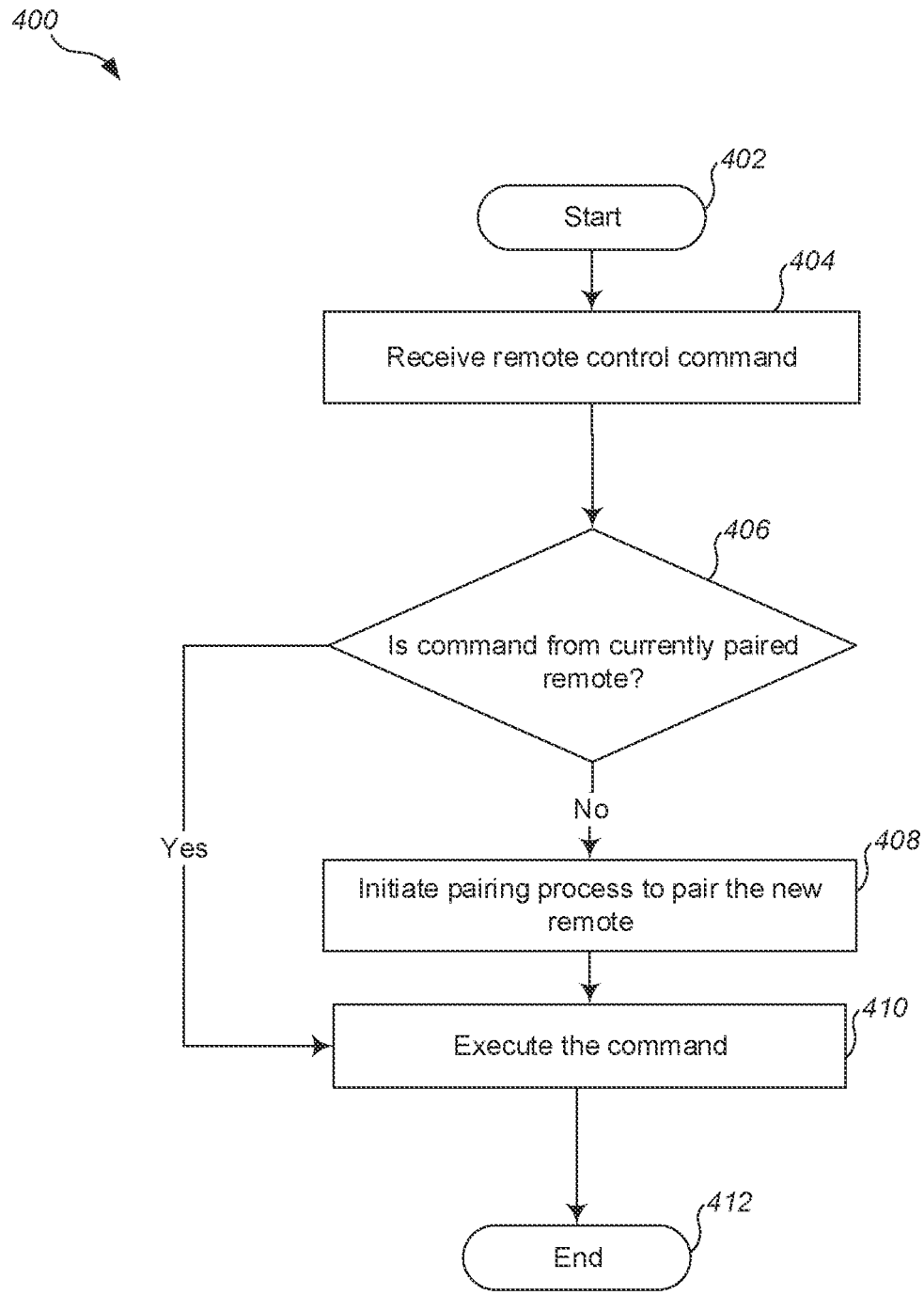
FIG. 4 is a flow diagram showing a method in a system for managing remote control units and paired devices, according to various embodiments as disclosed herein.

FIG. 4 is a flow diagram showing a method 400 in a system for managing remote control units and paired devices, according to various embodiments as disclosed herein.

A process of the method 400 starts at 402.

At 404, the system 100 receives a command from a remote control unit via a communications module.

At 406, the system 100 determines whether the command is from a remote control unit currently paired with a device of the system. If the system 100 determines that the command is from a remote control unit currently paired with the device, then the process proceeds to 410, where the command is executed. If the system 100 determines that the command is not from a remote control unit currently paired with the device, then the process proceeds to 408.

At 408, the system 100 initiates pairing of the remote control unit to the device in response to the determination that the command is from a remote control unit currently paired with the device. The process then proceeds to 410, where the command is executed (or in some instances the command may first be executed and the pairing process will then be initiated).

The process then ends at 412.

Figure 5:
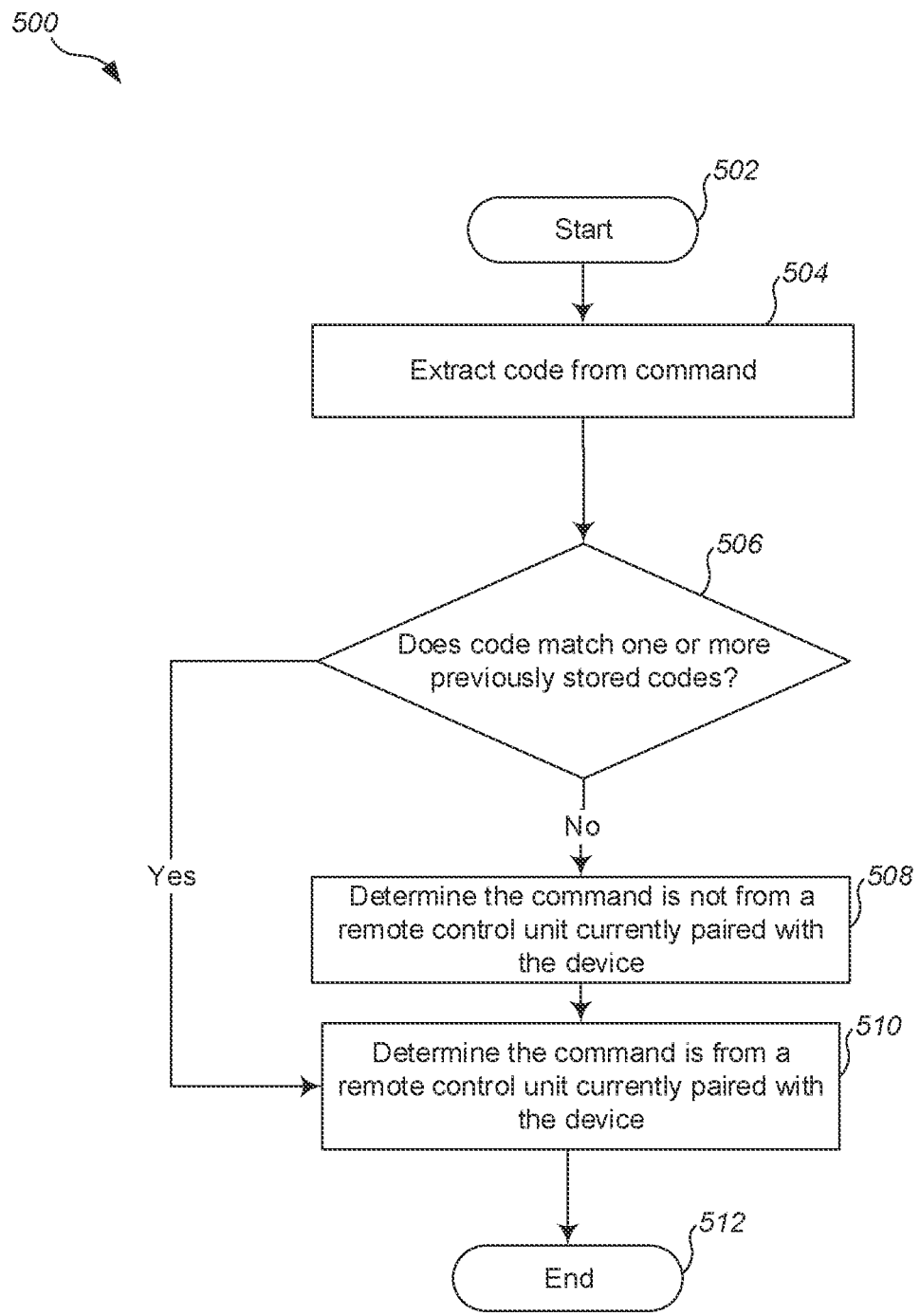
FIG. 5 is a flow diagram showing a method for determining whether a command is from currently paired remote that is useful in the method of FIG. 3, according to various embodiments as disclosed herein.

FIG. 5 is a flow diagram showing a method 500 for determining whether a command is from currently paired remote that is useful in the method of FIG. 3, according to various embodiments as disclosed herein.

A process of the method 500 starts at 502.

At 504, the system 100 extracts a code from the command.

At 506, the system 100 determines whether the extracted code matches one or more previously stored codes associated with one or more respective remote control units currently paired to a device of the system. If the system 100 determines that the extracted code does not match any previously stored codes associated with one or more respective remote control units currently paired to the device of the system, then the process proceeds to 508. If the system 100 determines that the extracted code does match a previously stored code associated with one or more respective remote control units currently paired to the device of the system, then the process proceeds to 510.

At 508, the system 100 determines that the command is not from a remote control unit currently paired with the device based on the determination that the extracted code does not match any previously stored code associated with a remote control unit currently paired to the device.

At 510, the system 100 determines that the command is from a remote control unit currently paired with the device based on the determination that the extracted code matches one or more previously stored codes associated with one or more respective remote control units currently paired to the device.

The process then ends at 512.

Figure 6:
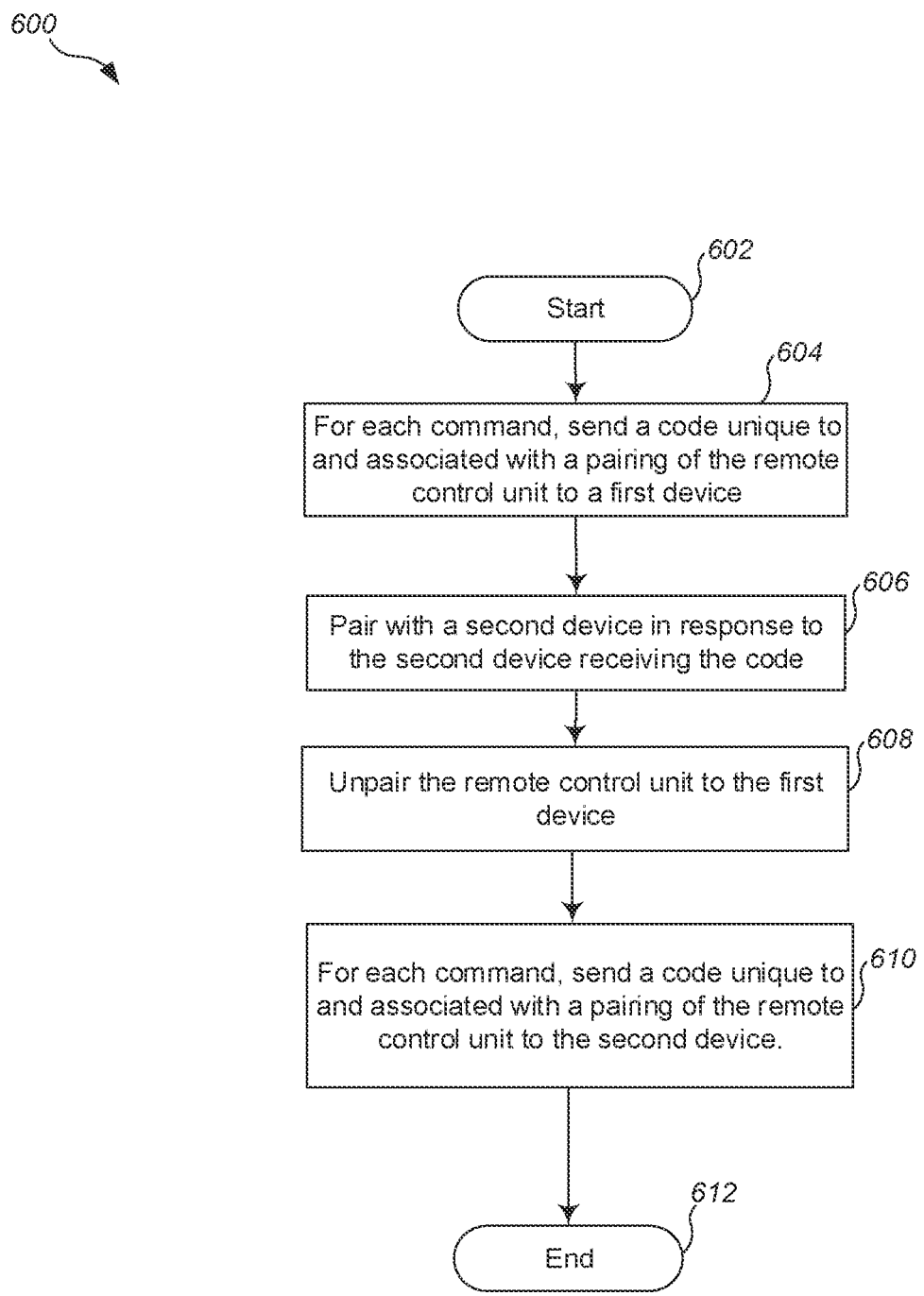
FIG. 6 is a flow diagram showing a method of a remote control device in a system for managing remote control units and paired devices, according to various embodiments as disclosed herein.

FIG. 6 is a flow diagram showing a method 600 of a remote control unit in a system for managing remote control units and paired devices, according to various embodiments as disclosed herein.

A process of method 600 starts at 602.

At 604, the remote control unit 104, for each command sent from the remote control unit via the communications module, sends a code unique to and associated with a pairing of the remote control unit to a first device (e.g., device A 102) controlled by the remote control unit, the code sent via a wireless medium different than a wireless medium over which the pairing occurs.

At 606, the remote control unit 104 pairs with a second device (e.g., device B 202) in response to the second device receiving the code unique to and associated with a pairing of the remote control unit to the first device.

At 608, the remote control unit 104 unpairs the remote control unit to the first device.

At 610, the remote control unit 104, after unpairing the remote control unit to the first device, for each command sent from the remote control unit via the communications module, sends a code unique to and associated with the pairing of the remote control unit to the second device.

The process then ends at 612.

Figure 7:
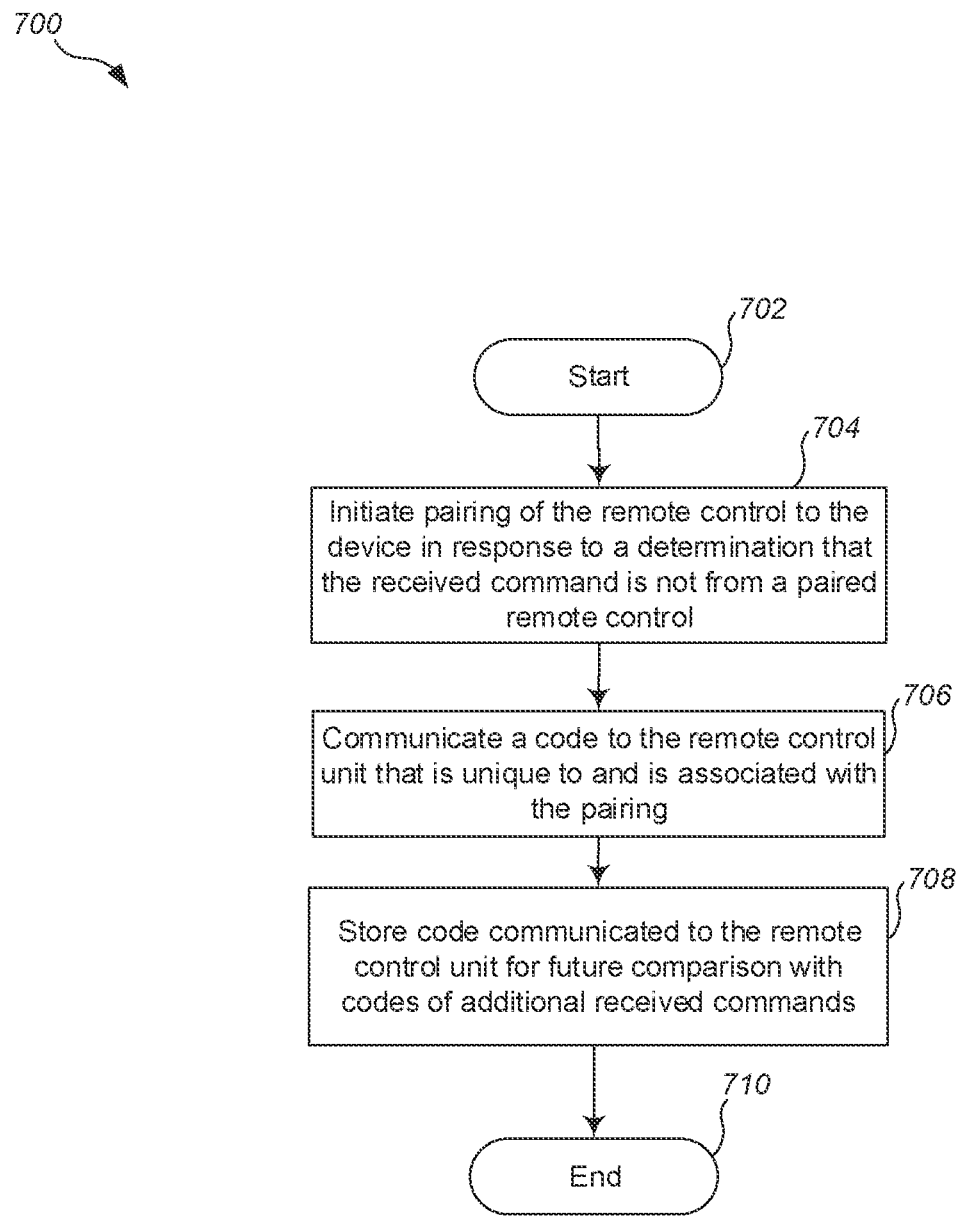
FIG. 7 is a flow diagram showing a method for pairing of a remote control device in a system for managing remote control units and paired devices, according to various embodiments as disclosed herein.

FIG. 7 is a flow diagram showing a method 700 for pairing of a remote control device in a system for managing remote control units and paired devices, according to various embodiments as disclosed herein.

A process of method 700 starts at 702.

At 704, the system 100 initiates the pairing of the remote control unit to a device in response to a determination that the command is not from a remote control unit currently paired with the device.

At 706, the system 100 communicates a code to the remote control unit that is unique to and is associated with the pairing of the remote control unit to the device to enable the remote control unit to send the code with commands via a wireless medium different than a wireless medium over which the pairing occurs.

At 708, the system 100 stores the code communicated to the remote control unit for future comparison with codes of additional commands sent to the device to determine, via a wireless medium different than a wireless medium over which the pairing occurs, whether the additional commands are from one or more remote control units currently paired with the device.

The process then ends at 710.

The various methods described herein may include additional acts, omit some acts, and/or may perform the acts in a different order than set out in the various flow diagrams.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via one or more microcontrollers. However, those skilled in the art will recognize that the embodiments disclosed herein, in whole or in part, can be equivalently implemented in standard integrated circuits (e.g., Application Specific Integrated Circuits or ASICs), as one or more computer programs executed by one or more computers (e.g., as one or more programs running on one or more computer systems), as one or more programs executed by one or more controllers (e.g., microcontrollers) as one or more programs executed by one or more processors (e.g., microprocessors), as firmware, or as virtually any combination thereof, and that designing the circuitry and/or writing the code for the software and/or firmware would be well within the skill of one of ordinary skill in the art in light of the teachings of this disclosure.

When logic is implemented as software and stored in memory, logic or information can be stored on any non-transitory computer-readable medium for use by or in connection with any processor-related system or method. In the context of this disclosure, a memory is a non-transitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this disclosure, a "computer-readable medium" can be any physical element that can store the program associated with logic and/or information for use by or in connection with the instruction execution system, apparatus, and/or device. The computer-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape. The various embodiments described above can be combined to provide further embodiments.

The above description of illustrated embodiments, including what is described in the Abstract of the Disclosure, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art in light of the disclosure.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method performed by a remote control unit, the method comprising:

for each command sent from a remote control unit via a communications module, sending a code unique to and associated with a pairing of the remote control unit to a first device controlled by the remote control unit, the code sent via a wireless medium different than a wireless medium over which the pairing occurs;

pairing with a second device in response to the second device receiving the code unique to and associated with a pairing of the remote control unit to the first device, wherein the pairing includes:

receiving a request from the second device to pair with the second device based on the code unique to and associated with the pairing of the remote control unit to a first device not matching a code previously stored by the second device;

completing pairing to the second device automatically in response to the request;

unpairing the remote control unit to the first device; and after unpairing the remote control unit to the first device, for each command sent from the remote control unit via the communications module, sending a code unique to and associated with the pairing of the remote control unit to the second device.

2. The method of claim 1, further comprising:

receiving from the second device, the code unique to and associated with the pairing of the remote control unit to the second device.

3. The method of claim 1, further comprising:
generating the code unique to and associated with the pairing of the remote control unit to the second device; and
sending to the second device, the code unique to and associated with the pairing of the remote control unit to the second device.

4. A method of changing of a pairing of a remote control unit with a first device to a pairing of the remote control unit with a second device, the method comprising:
the second device causing pairing of the remote control unit with the second device in response to the second device receiving from the remote control unit, for a command sent from a communications module of the remote control unit, a code unique to and associated with the pairing of the remote control unit to the first device, wherein the pairing of the remote control unit with the second device includes:
the second device sending a request from the second device to pair with the remote control unit based on the code unique to and associated with the pairing of the remote control unit to the first device not matching a code previously stored by the second device;
the second device completing pairing with the remote control unit based on the request being sent;
the second device causing the remote control unit to unpair from the first device based on the request being sent; and
after the unpairing of the remote control unit to the first device, for each command sent from the remote control unit via the communications module, the second device receiving a code unique to and associated with the pairing of the remote control unit to the second device.

5. The method of claim 4, further comprising:
the second device sending the code unique to and associated with the pairing of the remote control unit with the second device.

6. The method of claim 4, further comprising:
receiving, by the second device, the code unique to and associated with the pairing of the remote control unit with the second device.

\* \* \* \* \*